United States Patent [19]

Brandt

[11] 3,995,667
[45] Dec. 7, 1976

[54] LIQUID HANDLING APPARATUS

[76] Inventor: Michael W. Brandt, P.O. Box 1092, Stillwater, Okla. 74074

[22] Filed: May 1, 1975

[21] Appl. No.: 573,490

Related U.S. Application Data

[63] Continuation-in-part of Ser. Nos. 462,364, April 19, 1974, abandoned, and Ser. No. 532,446, Dec. 13, 1974.

[52] U.S. Cl. .............................. 141/18; 141/301; 141/363
[51] Int. Cl.² ......................................... B65B 3/04
[58] Field of Search ................. 141/2, 3, 1, 18–20, 141/100, 346–352, 291–296, 301, 326, 29, 374, 363–366, 59, 302; 220/86 R, 366, 373; 206/315 B

[56] References Cited
UNITED STATES PATENTS 3,187,787  6/1965  Kerr ................................ 141/348

Primary Examiner—Houston S. Bell, Jr.
Attorney, Agent, or Firm—Howard E. Moore; Gerald G. Crutsinger

[57] ABSTRACT

Liquid handling apparatus adapted for transferring a measured quantity of toxic liquid pesticide from a storage container into a tubular body and for transferring the toxic liquid pesticide from the tubular body into a pressurizable container. The storage container, the tubular body, and the pressurizable container each has an inwardly opening check valve in an opening communicating with the interior thereof. Each check valve has a stem extending outwardly therefrom. The stem on the check valve communicating with the interior of the storage container is positionable in abutting relation with the stem on the check valve communicating with the interior of the tubular body for opening the respective valves to permit transfer of liquid from the storage container into the tubular body. The stem on the check valve communicating with the interior of the tubular body is positionable in abutting relation with the stem on the check valve communicating with the interior of the pressurizable container to permit transfer of liquid from the tubular body into a pressurizable container.

16 Claims, 9 Drawing Figures

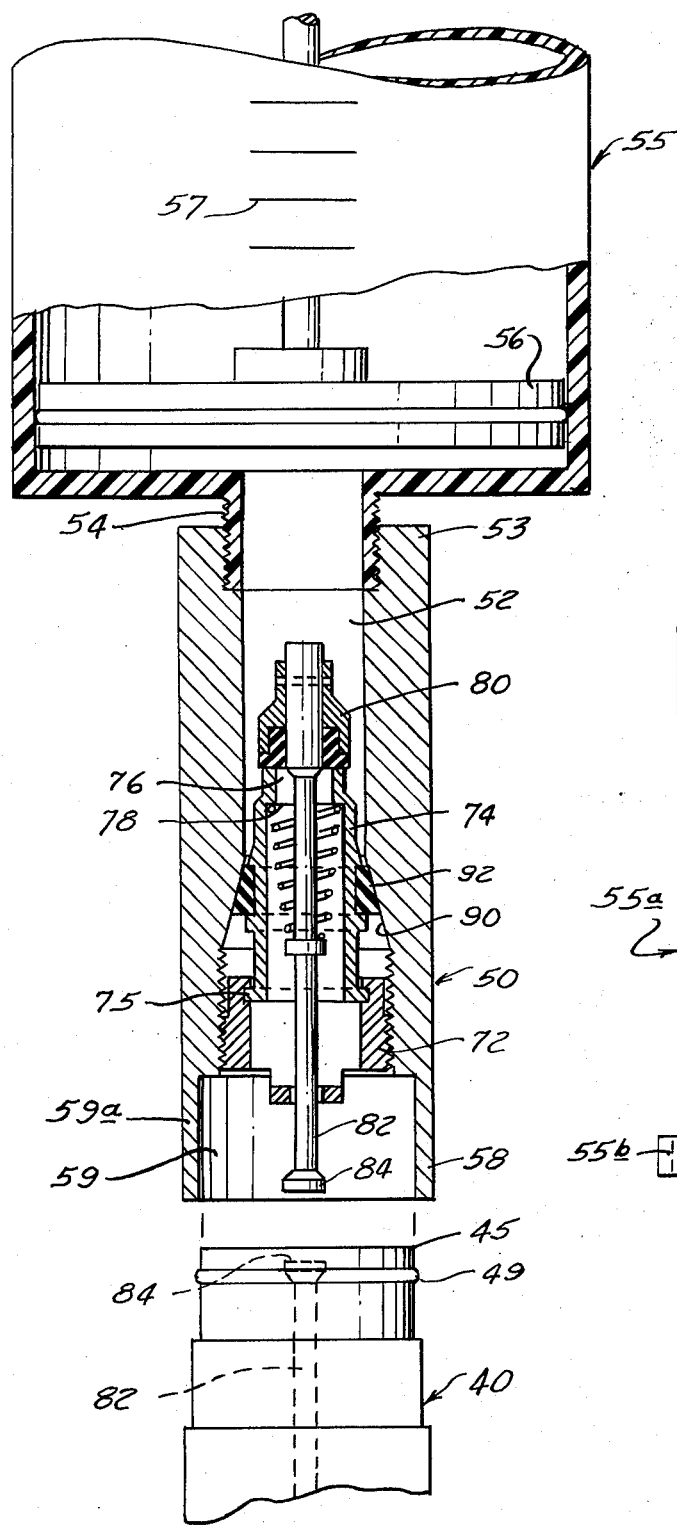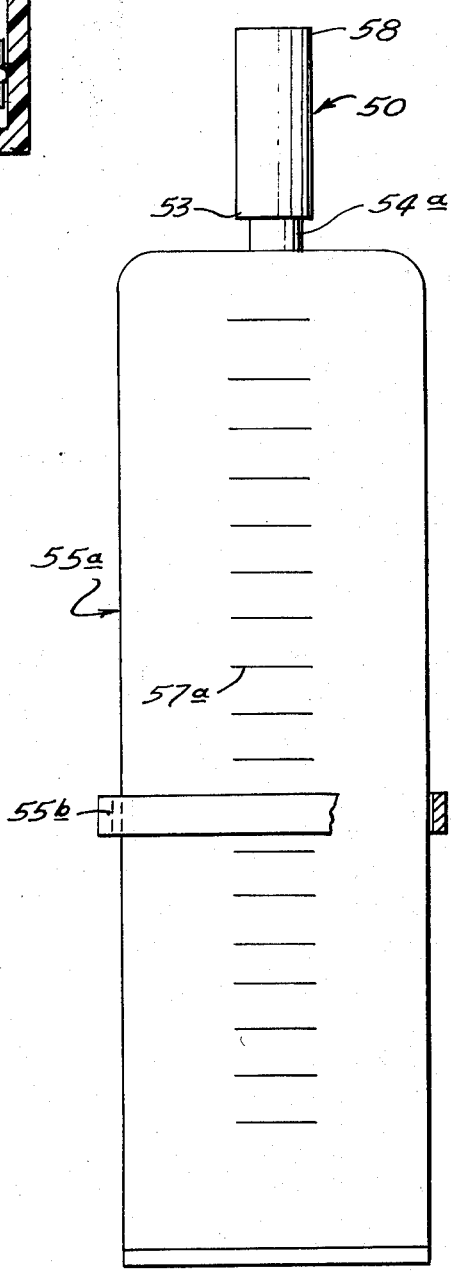
FIG 8
FIG 9

LIQUID HANDLING APPARATUS

CROSSREFERENCE TO RELATED APPLICATIONS

This is a continuation-in-part of my copending application, Ser. No. 462,364, now abandoned, filed Apr. 19, 1974, entitled "Chemical Injector" and my copending application, Ser. No. 532,446 filed Dec. 13, 1974, entitled "Liquid Injector."

BACKGROUND

Hazards are encountered in handling and measuring chemical pesticides and fertilizers due to the poisonous nature of these chemicals.

Chemical pesticides and fertilizers are generally packaged by manufacturers in concentrated form in a suitable storage container or vessel constructed of various materials such as tin, glass, plastic and the like. Heretofore, toxic liquid pesticide has been poured from the storage container into a measuring vessel, such as a tablespoon or measuring cup, and then poured from the measuring vessel into suitable sprayer apparatus.

Hazards arise when the young, the uneducated, the illiterate, and the inexperienced users attempt to introduce chemicals into a sprayer. Dangers arise from the improper handling of such chemicals both to the user from improper body contact with the chemical and to plants from improper doses of the chemical.

Plants are harmed when an excessive quantity of pesticide or chemical is applied to them. This is often caused by an inexperienced or illiterate person using the chemical in such a way that plants react adversely to excessive amount of chemical or pesticide. Farmers often issue pesticide to farm workers to apply to crops but the farm worker may be unable to determine the proper quantity or method of the application due to lack of knowledge of the numerous chemicals on the market today.

Likewise nurseries often issue bulk quantities of pesticides and chemicals to inexperienced home gardeners who may not have the proper respect for the dangers of such highly dangerous chemicals and pesticides. Further, one who is experienced in the use of pesticides and chemicals often has a tendency to become careless and mishandle these valuable but dangerous chemicals.

The United States Department of Agriculture has released many bulletins, which outline safety rules for pesticide application, admonishing one to read and follow directions on the pesticide container. These rules include mixing the pesticide solutions in a well ventilated area to avoid inhaling the sprays or dusts; the avoidance of mixing flammable solutions around an open flame; avoidance of over application of chemicals onto areas frequented by pets and wildlife; avoidance of harmful over application of chemicals to flowers and ornamental shrubs and other valuable plants; avoidance of chemical contact with skin and clothing including directions to wash away any residue, immediately following handling, with soap and water and to change clothing; and storage of pesticides and chemicals in well labeled containers out of the reach of children and pets. These safety rules have been formulated by the U.S. Agriculture Department to safeguard the public since many people have been poisoned due to the improper use of chemicals.

In pouring liquid pesticide from a storage container into a measuring vessel and subsequently into a sprayer, the toxic pesticide is often spilled or mismeasured resulting in unnecessary contamination of the environment and exposing the user to extreme, and often unappreciated hazard.

SUMMARY

I have devised a method and apparatus for removing a measured quantity of liquid from a storage container and depositing the measured quantity of toxic liquid into a sprayer while maintaining the toxic liquid in a sealed system at all times while it is being transferred from the storage container into the sprayer.

The system comprises a closure for the storage container, a liquid transfer body, a closure for the sprayer; and adapter bodies connectable to each of the closures and to the transfer body for maintaining the toxic liquid sealed from ambient atmosphere while the liquid is being transferred from the storage container to the sprayer.

The storage container comprises a cap detachably secured to an outlet opening formed in the storage container. The cap has two check valves extending through passages formed therein, one of the passages being a vent passage and the other passage extending through a tube communicating with the bottom of the storage container to permit drawing of liquid from the storage container without inverting the container.

The adapter secured to the sprayer is a T-shaped fitting having three passages formed therein, a first passage communicating with the interior of the sprayer, a second passage communicating with a dispenser hose, and a third passage having a check valve through which toxic liquid is dispensed into the sprayer.

The transfer body has an adapter secured thereto which is positionable in sealing relation with the adapter secured to the closure of the storage container. When the adapter on the transfer body is telescopically disposed in sealing relation with the end of the adapter on the storage container closure, valve stem elements on check valves in the adapter bodies are moveable into contacting relationship to simultaneously move valve elements to open passages permitting flow of liquid through the adapter bodies.

A primary object of the invention is to provide a method and apparatus for handling toxic liquid wherein a precisely measured quantity of liquid can be transferred from a storage container to a sprayer while minimizing the possibility that the toxic liquid will come into contact with the body of a person depositing the liquid in the sprayer and while minimizing the possibility that vapor of the toxic liquid might be inhaled.

Another object of the invention is to provide a method and apparatus for storing toxic liquid wherein a closure cap is provided for a storage container, the closure cap having a vent passage formed therein and a check valve associated with the vent passage to permit flow of air into the dispensed while preventing flow of liquid or vapor of the liquid from the container outwardly through the vent passage.

Another object of the invention is to provide a method and apparatus for handling toxic liquid wherein a closure is provided for a storage container, the closure having an adapter body extending through a passage formed therein, the adapter body terminating adjacent the bottom of the storage container and having an upwardly extending neck communicating with the exterior of the storage container to permit drawing of liquid from the storage container without inverting the container.

A further object of the invention is to provide a method and apparatus for handling toxic liquid wherein a compressed air sprayer has an adapter body secured thereto, the adapter body having a first passage communicating with the interior of the sprayer, a second passage through which diluted toxic liquid is dissensed from the sprayer and a third passage having a check valve therein through which concentrated toxic liquid is dispensed.

A further object of the invention is to provide a method and apparatus for handling toxic liquid wherein a first adapter body is secured to a transfer tube containing toxic liquid and a second adapter body is secured to a compressed air sprayer, the first and second adapter bodies being formed to be positioned in sealing relation prior to engagement of valve stem elements in the respective bodies for opening check valves in the first and second adapter bodies to permit flow of toxic liquid from the transfer tube body into the sprayer.

A still further object of the invention is to provide a method of handling toxic liquid wherein an adapter body on a transfer tube is positionable first into sealing relation with an adapter body on a storage container for drawing liquid from the storage container and then into sealing relation with an adapter body on a compressed air spray container for urging the toxic liquid into the spray container.

Other and further objects of the invention will become readily apparent upon referring to the detailed description hereinafter following and to the drawings annexed hereto.

DESCRIPTION OF DRAWING

Drawings of a preferred embodiment of the invention are annexed hereto so that the invention may be better and more fully understood, in which:

FIG. 8 is a fragmentary cross-sectional view of the transfer tube; and

FIG. 9 is a perspective view of a modified form of transfer tube.

Numeral references are employed to designate like parts throughout the various figures of the drawing.

DESCRIPTION OF A PREFERRED EMBODIMENT

Figure 4:
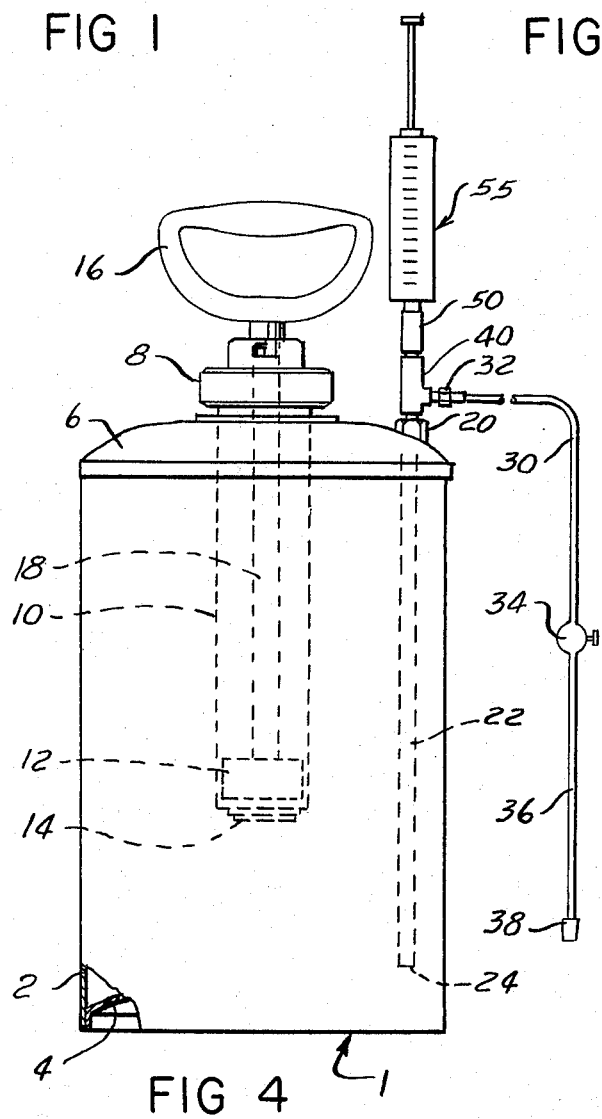
FIG. 4 is an elevational view of a compressed air sprayer having the adapter illustrated in FIG. 1 and the transfer tube body illustrated in FIG. 2 associated therewith.

Referring to FIG. 4 of the drawing, the numeral 1 generally designates a cylindrical shaped spray container having a sidewall 2, a bottom 4 welded or otherwise secured to the lower end of the sidewall, and a top 6. The top 6 has an air pump 8 secured thereto communicating with the inside of the container.

Air pump 8 comprises a hollow cylinder 10 having a piston 12 slideably disposed therein and having a check valve 14 secured to the lower end of the cylinder 10. Conventional locking apparatus is employed for detachably securing handle 16, secured to rod 18 with which is attached to piston 12, in the position illustrated in FIG. 4 after air has been pumped into the spray container 1.

When it is desired to increase pressure inside the container 1, handle 16 is rotated, for example 35 degrees, permitting movement thereof relative to container 1 for pumping air into the container and increasing pressure therein.

An internally threaded coupling 20 extends through an opening formed in top 6 of spray container 1. Coupling 20 has a downwardly extending hollow tube 22 secured thereto. The lower end 24 of tube 22 terminates adjacent bottom 4 of spray container 1 such that liquid in container 1, when pressurized, will follow upwardly through passage 26.

As will be hereinafter more fully explained, a dispenser hose 30 is connected through a coupling swivel 32 in fluid communication with passage 26 extending through tube 22 and coupling 20. Hose 30 is connected to an inlet passage of a valve 34 and the outlet passage of valve 34 communicates with the interior of a hollow tubular wand 36 having a spray nozzle 38 on an end thereof for spraying liquid therethrough.

In the particular embodiment of the invention illustrated in FIGS. 1, 4 and 7 of the drawing, adapter body 40 secured to spray container 1 comprises a tee coupling having threads 41 thereon threadedly secured to threads 21 formed in coupling 20 which is welded to the top 6 of spray container 1.

In the illustrated embodiment, adapter 40 has a first passage 42 axially aligned with a third passage 44 forming a straight bore extending through the body of adapter 40 and has a second passage 46 extending laterally and communicating with the first and third passages. The second passage 46 extends through a threaded connector portion 47 of adapter body and connector portion 47 is threadedly secured to coupling swivel 32 on dispensing hose 30.

Portion 43 of adapter body 40, through which the third passage 44 extends, is externally threaded to receive an internally threaded cap 48 for closing passage 44.

The outer end 45 of the upper portion 43 of adapter body 40 has an annular groove formed in the outer surface thereof in which an O-ring seal 49 is secured. O-ring seal 49 is urged into sealing relation with the inner wall of cap 48 and, as will be hereinafter more fully explained, it is urged into sealing relation with the inner wall of adapter 50 on the transfer tube.

Referring to FIGS. 2 and 8 of the drawing, the numeral 50 generally designates a cylindrical adapter body having a longitudinally extending bore 52 extending therethrough. The end 53 of adapter body 50 is internally threaded and is secured to externally threaded neck 54 on liquid transfer tube body 55.

In the embodiment of the invention illustrated in FIG. 8, transfer tube 55 comprises a syringe having a piston 56 slideably disposed therein and having indicia 57 suitably calibrated to indicate the volume of liquid contained within body 55.

A modified form of the liquid transfer tube body is generally designated by numeral *55a* in FIG. 9 of the drawing. Body *55a* comprises a flexible tube having a neck 54a formed thereon threadedly secured to an adapter 50 which is identical to that illustrated in FIG. 8 of the drawing. Tube 55a has a rigid slide element 55b moveable therealong for forcing the contents of tube 55a toward the neck 54a. Indicia 57a are formed on tube 55a to indicate the volume of material dispensed therefrom.

Figure 1:
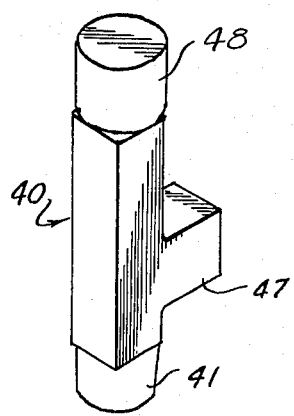
FIG. 1 is a perspective view of an adapter connectable to a sprayer.
Figure 2:
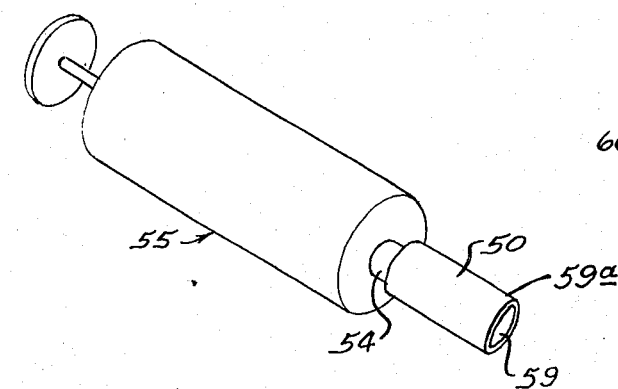
FIG. 2 is a perspective view of a transfer body.
Figure 3:
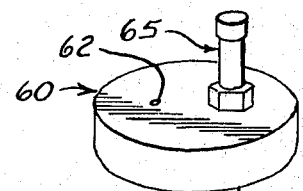
FIG. 3 is a perspective view of a closure for a storage container.
Figure 5:
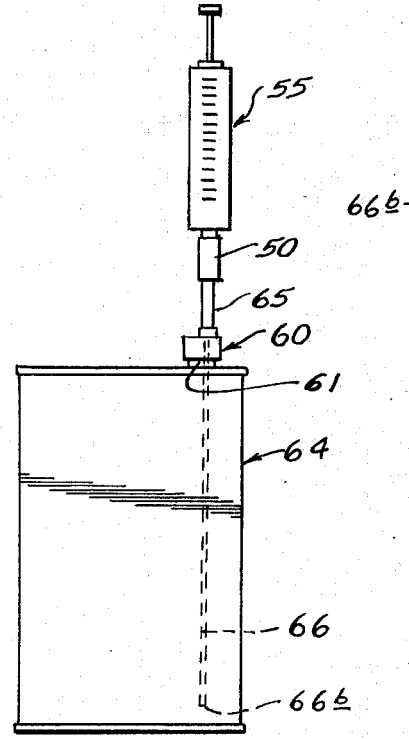
FIG. 5 is an elevational view of a storage container having the closure illustrated in FIG. 3 and the transfer tube illustrated in FIG. 2 associated therewith.
Figure 6:
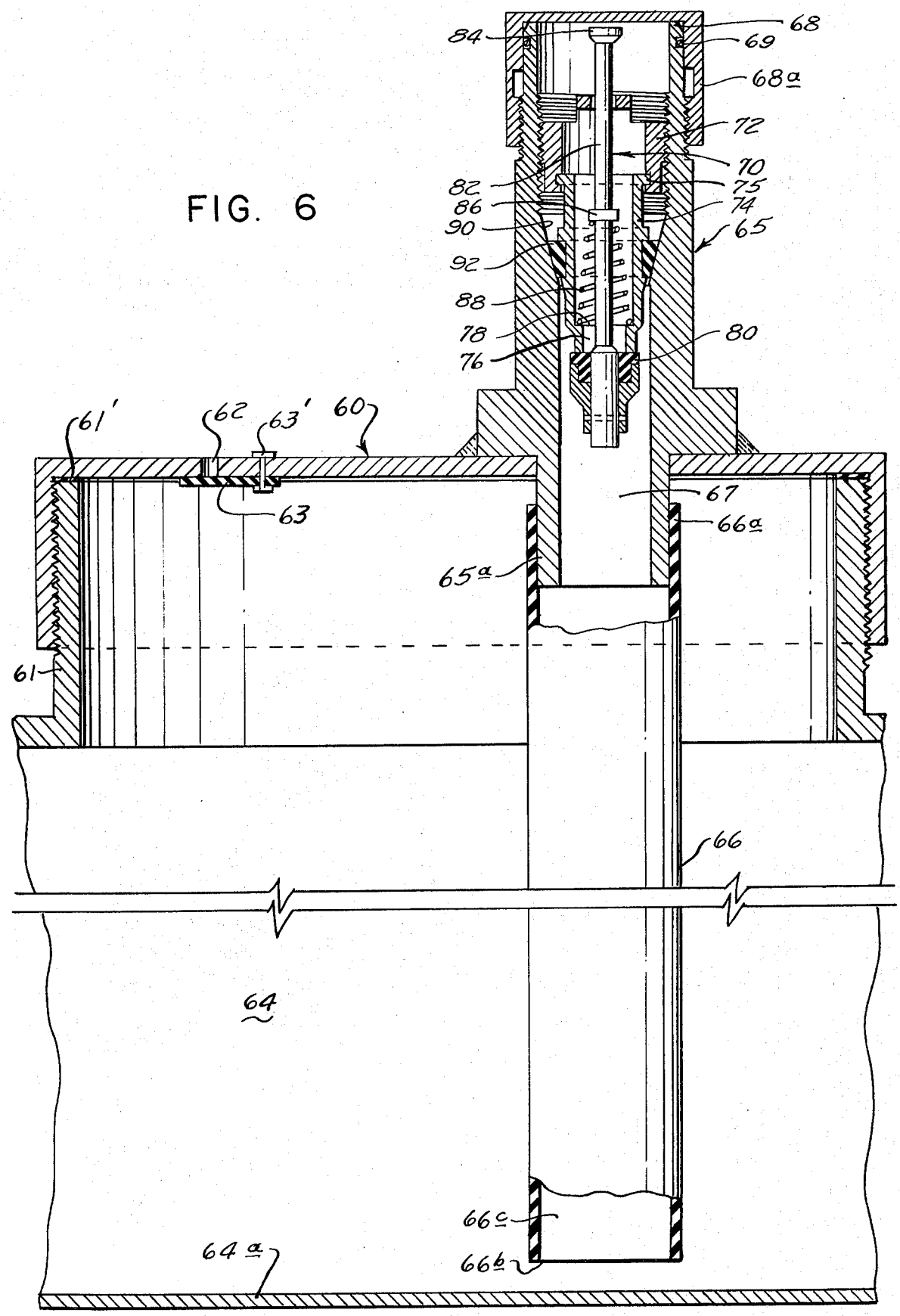
FIG. 6 is a fragmentary cross-sectional view of the storage container and the closure illustrated in FIG. 3 associated therewith.

Referring to FIGS. 3, 5 and 6 of the drawing, the numeral 60 generally designates a closure cap which is internally threaded for connection to neck 61 of storage container 64. Storage container 64 in the illustrated ebodiment comprises a tin can of dimensional design.

Cap 60 has a vent passage 62 extending therethrough and has a resilient closure element 63 secured adjacent passage 62 by a rivet 63'. It should be appreciated that resilient member 63 is deflectable to permit passage of air through the passage 62 into the interior of container 64. However, resilient member 63 prevents passage of air or vapor of the contents of container 64 from the interior of the can through vent passage 62 to atmosphere.

An adapter body 65 has a downwardly extending neck 65a which extends through an opening formed in cap 60. A tubular member 66 has an upper end 66a secured to neck 65a and has a lower end 66b terminating adjacent the bottom 64a of container 64. Tube 66 has a passage 66c extending therethrough.

It should be appreciated that application of the partial vacumn adjacent the upper end of tube 66 permits flow of liquid upwardly through passage 66c and causes resilient member 63 to move downwardly as a result of reduction of pressure in container 64 causing air to flow through vent passage 62.

Adapter body 65 has a passage 67 extending therethrough. A groove is formed about the upper end 68 of adapter body 65 and has an O-ring seal 69 disposed therein.

Adapter body 65 is preferably welded or otherwise sealingly secured to cap 60 and a gasket 61" is urged into sealing relation with neck 61 and cap 60.

Figure 7:
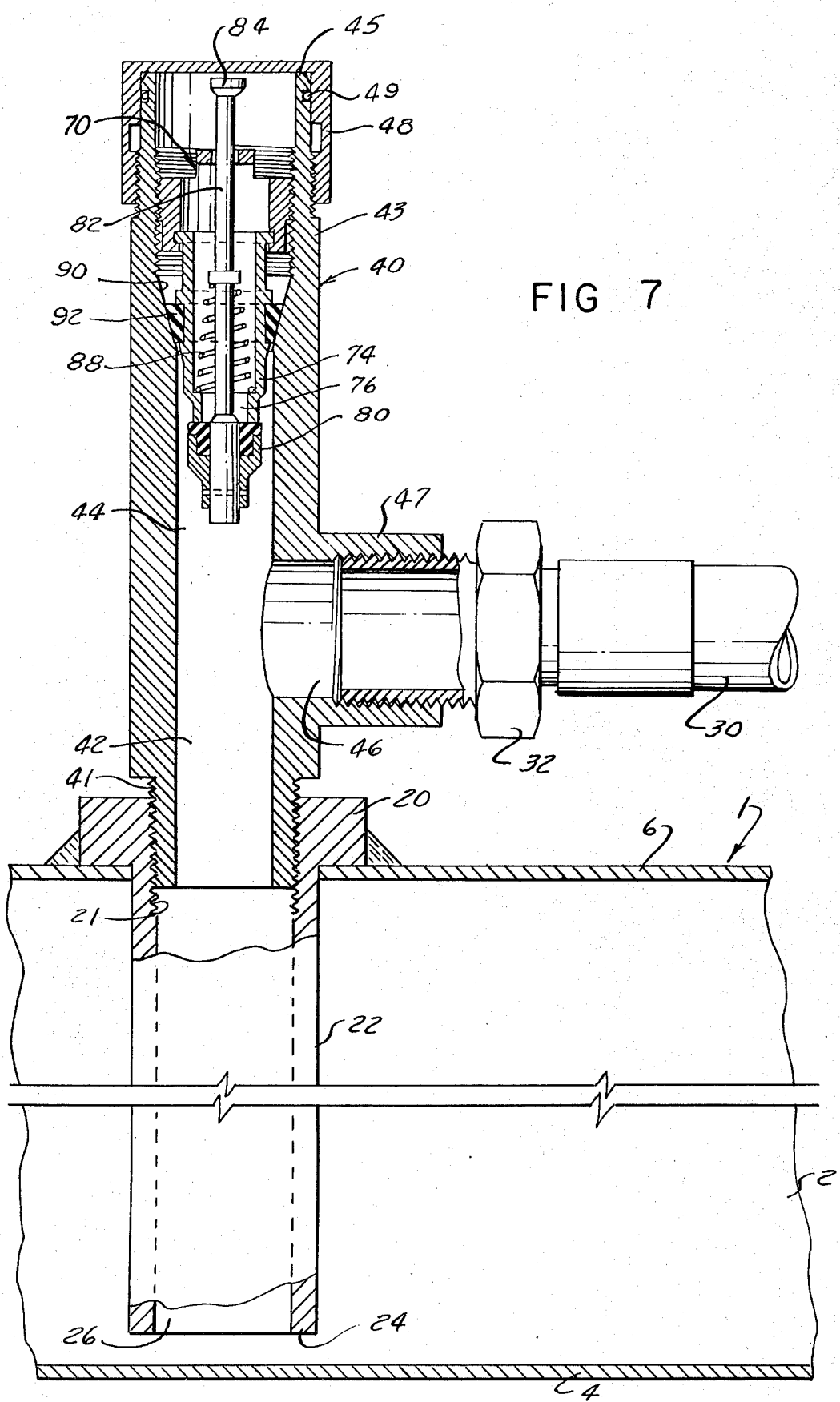
FIG. 7 is a fragmentary cross-sectional view of the sprayer illustrated in FIG. 4 having the adapter body illustrated in FIG. 1 associated therewith.

Referring to FIGS. 6, 7 and 8 of the drawing, it should be noted that a valve body 70 is mounted in a passage formed in each of the adapters 40, 50 and 65.

Each valve element 70 comprises an externally threaded coupling swivel 72 having a lower end rotatably secured to a hollow tube 74 having a flange 75 about the upper end thereof received in a groove in coupling swivel 72. Each tube 74 has a passage 76 extending therethrough and has an inwardly extending shoulder 78 formed in the passage. A valve seal element 80 has a stem 82 secured thereto, stem 82 extending through passage 76 and having an upper end 84 terminating adjacent the end of the adapter body.

Stem 82 has a shoulder 86 formed thereon intermediate opposite ends and a spring 88 is disposed between shoulder 78 and shoulder 86 urging seal element 80 into sealing relation with the end of tube 74 which forms a valve seat.

Valve element 70 is of the type heretofore employed as a valve core associated with pneumatic tires of vehicles. Valve element 70 is preferably of the type known as the Schrader valve.

Passage 44 in adapter body 40, passage 52 in adapter body 50, and passage 57 in adapter body 65 has a tapered sealing surface 90 intermediate opposite ends thereof and a conical shaped seal element 92 secured to tube 74 of valve element 70 is urged into sealing engagement therewith.

It should be appreciated that the end 45 of adapter body 40 and the end 68 of adapter body 65 are of substantially identical construction while the end 58 of adapter body 50 (see FIG. 8) has an enlarged bore 59 formed in a sleeve 59a such that O-ring seal 49 on adapter body 40 and O-ring seal 69 on adapter body 65 will be moved into sealing relationship prior to abuttment of the ends 84 of stems 82 as sleeve 59a is moved downwardly. As ends 84 on stems 82 of the respective valve elements 70 move into abutting relation seal element 80 will be moved away from the ends of tubes 74 permitting flow of liquid through the adapter bodies. As adapter body 50 is moved away from adapter body 40 or adapter body 65, seal elements 80 will move into sealing relation with the ends of tubes 74 before the sleeve 59a moves out of sealing relation with O-ring seal 49 or 69.

OPERATION

The operation and function of the apparatus hereinbefore described is as follows:

The conventional cap is removed from container 64 and closure 60 is screwed onto the threaded neck 61 of storage container 64. Storage container 64 is then adapted to permit movement of liquid therefrom without exposing a person handling the liquid to the toxic liquid or to vapors therefrom.

To convert a conventional pressurizable spray container to form the apparatus illustrated in FIG. 4 of the drawing, coupling swivel 32 is disengaged from coupling 20 and the threaded end 41 of adapter body 40 is threadedly secured in coupling 20. Coupling swivel 32 is then connected to threaded coupling portion 47 of adapter body 40.

Sleeve 59a of adapter body 50 on syringe 55 is then positioned above the end 68 of adapter body 65 and moved downwardly until ends 84 of valve stems 82 are moved into abutting relation thereby separating seal elements 80 from ends of tubes 74. Movement of piston 56 upwardly through syringe body 55 creates a partial vacumn drawing liquid upwardly through passage 66c into the body of syringe 55. When a predetermined volume of liquid has been drawn into the body of syringe 55, adapter body 50 is moved upwardly causing seal elements 80 to move into engagement with ends of tubes 74.

It should be appreciated that when seal element 80 engages the end of tube 74 in adapter body 50, piston 56 cannot be moved downwardly through syringe 55 to inadvertently discharge toxic liquid after body 50 is disengaged from adapters 40 and 65.

After syringe 55 has been filled, cap 48 is removed from adapter bodying 40 on sprayer 1. Sleeve 59a on adapter body 50 is then positioned in telescopically disposed relation with the end 45 of adapter body 40 causing seal elements 80 in adapter body 40 and adapter body 50 to be moved out of engagement with ends of tubes 74 such that piston 56 may be moved downwardly to eject liquid into spray container 1. While liquid is being injected into spray container 1, valve 34 on dispenser hose 30 (see FIG. 4) is preferably closed to prevent entry of concentrated toxic liquid into passage 46 in adapter body 40.

After liquid has been deposited through adapter body 40 into sprayer 1, valve 34 is opened thereby venting the upper end of tube 22 through passage 42 and 46 permitting the concentrated liquid to drain out of the lower tube 22 into sprayer 1.

Valve 34 should be opened prior to filling spray container 1 with water for mixing and diluting the concentrated pesticide.

Water is preferably delivered to the inside of spray container 1 through an adapter identical to that generally designated by numeral 50 in FIG. 8 of the drawing which is connected to a suitable source of water (not shown). After water has been deposited in spray container 1 and mixed with concentrated pesticide, sprayer 1 is pressurized such that upon opening of valve 34 liquid pesticide will flow upwardly through passage 26 in tube 22 and through passage 44, hose 30, wand 36 and nozzle 38.

The operation and function of the form of transfer tube body illustrated in FIG. 9 of the drawing is similar to that of the use of syringe 55 for depositing liquid in sprayer 1. However, tube 55a serves the dual purpose of a storage container and a transfer tube and is particularly adapted for distribution to the consumer through nurseries for use in treatment of yards and gardens.

From the foregoing it should be readily apparent that the method and apparatus hereinbefore described for transferring liquid to a spray container accomplishes the objects of the invention hereinbefore discussed.

Since check valves are provided in each of the adapters 40, 50 and 65 which automatically close, inadvertent dispensing of liquid is rendered almost impossible, particularly since the ends 84 of valve stems 82 are recessed within the valve bodies.

It should be readily apparent that other and further embodiments of the invention may be devised without departing from the basic concept thereof.

Having described my invention, I claim:

1. Apparatus for transferring liquid from a transfer container to a sprayer container, each container having an opening communicating with the inside thereof comprising: a first inwardly opening check valve in the opening communicating with the inside of the transfer container; a second inwardly opening check valve in the opening communicating with the inside of the sprayer container; each of said inwardly opening check valves comprising: a valve body having a passage formed therein and having a valve seat adjacent said passage; a seal element; a stem on said seal element; resilient means urging said seal element into sealing engagement with said valve seat, said stem extending through said passage; connector means; means securing said connector means to said valve body such that said connector means on said inwardly opening check valve in the opening communicating with the inside of the transfer container is in sealing relation with connector means in the opening communicating with the inside of the sprayer container; and support means on each container positioning each valve body such that the stems on seal elements in the first and second check valves are positionable in abutting relation to simultaneously move the first and second seal elements out of sealing engagement with the first and second valve seats to permit flow of liquid from the transfer container into the sprayer container.

2. A closure for a container comprising: a cap, said cap having a vent passage therethrough; means associated with said vent passage permitting passage of fluid through said vent passage in one direction and preventing passage of fluid through said vent passage in the opposite direction; a valve body secured to said cap, said valve body having a valve passage extending therethrough, said valve passage extending through said cap; a valve element in said valve passage, said valve element being moveable between a first position closing said valve passage and a second position opening said valve passage; a tube secured to said valve body; and means to secure said cap to a container such that said tube extends into the container.

3. The combination called for in claim 2 wherein said valve body comprises: a body having a downwardly extending neck, said tube being secured to said neck.

4. The combination called for in claim 2, said valve passage having a valve seat formed therein; resilient means urging said valve element toward said first position such that said valve element engages said valve seat; and means in said valve passage arranged to move said valve element toward said second position.

5. The combination called for in claim 4 with the addition of: a hollow tubular member, said valve seat being formed on the end of said hollow tubular member; and means securing said hollow tubular member in said valve passage.

6. The combination called for in claim 5 wherein said means to move said valve element comprises: a stem extending through said hollow tubular member, said stem having a first end secured to said valve element and a second end positioned adjacent an end of the valve passage, said resilient means urging said stem longitudinally of said hollow tubular member.

7. The combination called for in claim 6 with the addition of: a transfer tube having an outlet passage formed therein; an adaptor body secured to said transfer tube, said adaptor body having a passage formed therein communicating with the opening in the transfer tube; means disengageably securing said adaptor body to said valve body; seal means between said adaptor body and said valve body; a seal element in said passage in said adaptor body, said seal element being moveable between a first position closing said passage through said adaptor body and a second position opening said passage through said adaptor body; and means associated with said seal means engageable with said second end of the stem secured to the valve element in the valve body secured to said cap arranged to move said valve element and said seal element from said first positions to said second positions such that the valve passage and the passage through the adaptor body are opened to permit transfer of fluid therethrough.

8. Apparatus to transfer pesticide into a pesticide spray system comprising: a hollow tubular body; said body being closed at one end and having an outlet opening at the other end; means movable longitudinally of said body to move liquid in the body toward the outlet opening; a check valve in the outlet opening; resilient means urging said check valve to a first position closing said outlet passage; connector means secured to said hollow tubular body, said connector means being adapted to detachably secure said tubular body to the pesticide spray system; and means arranged to move said check valve from said first position to a second position to permit flow of liquid from said tubular body through said outlet into the pesticide spray system when said connector means is secured to said spray system.

9. The combination of claim 8, said hollow tubular body comprising: a syringe body having a bore; and said means movable longitudinally of said body to move liquid in the body toward the outlet opening comprising: a piston movable through said bore.

10. The combination of claim 9, said syringe body having indicia thereon to indicate the volume of liquid contained within the syringe body.

11. The combination of claim 8, said hollow tubular body comprising: a flexible tube having a neck formed thereon, said outlet opening being formed in said neck.

12. The combination of claim 11, said means movable longitudinally of said body to move liquid in the body toward the outlet opening comprising: a slide element having a slot formed therein, said tube being received in said slot such that the tube is flattened when said slide element is moved toward said neck.

13. The combination of claim 12, said flexible tube having indicia thereon to indicate the volume of liquid contained within the flexible tube when the slide element is positioned adjacent said indicia.

14. The combination of claim 11, with the addition of means detachably securing said check valve to said neck.

15. The combination of claim 8, said connector means comprising: a first adapter body; means securing said first adapter body to the pesticide spray system; a second adapter body; means securing said second adapter body to said hollow tubular body; and means to detachably secure said first adapter body to said second adapter body.

16. The combination of claim 15, said first adapter body comprising: a tee coupling having first, second and third passages formed therein, said second adapter body being connectable such that said outlet opening in the hollow tubular body communicates with a first of said passages; a hose; means securing said hose to said tee coupling such that fluid from said second passage is delivered through said hose; and said means securing the first adapter body to the spray system is adapted to secure the tee coupling such that the third passage communicates with a mixing container of the spray system.

* * * * *